(12) United States Patent
Schönauer et al.

(10) Patent No.: US 7,712,572 B2
(45) Date of Patent: May 11, 2010

(54) STEERING ACTUATION DEVICE FOR A VEHICLE, IN PARTICULAR FOR AN INDUSTRIAL TRUCK

(75) Inventors: Michael Schönauer, Moosburg (DE); Robert Hämmerl, Hohenthann (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 656 days.

(21) Appl. No.: 11/543,475

(22) Filed: Oct. 5, 2006

(65) Prior Publication Data
US 2007/0074924 A1   Apr. 5, 2007

(30) Foreign Application Priority Data
Oct. 5, 2005   (DE) ................... 10 2005 047 766

(51) Int. Cl.
*B60K 26/00* (2006.01)
(52) U.S. Cl. ............ 180/333; 180/444; 74/501.6; 74/552; 74/557
(58) Field of Classification Search .......... 180/333, 180/402, 444; 74/491, 501.6, 552, 557
See application file for complete search history.

(56) References Cited

U.S. PATENT DOCUMENTS

| | | | | |
|---|---|---|---|---|
| 5,365,803 | A * | 11/1994 | Kelley et al. | 74/484 R |
| 6,039,142 | A * | 3/2000 | Eckstein et al. | 180/333 |
| 6,382,345 | B2 * | 5/2002 | Kada et al. | 180/446 |
| 6,474,688 | B1 * | 11/2002 | Bogren et al. | 280/771 |
| 6,491,128 | B1 * | 12/2002 | Lehmann et al. | 180/315 |
| 6,585,073 | B2 * | 7/2003 | Lorenz | 180/332 |
| 6,971,471 | B2 * | 12/2005 | Baker et al. | 180/329 |
| 6,997,281 | B2 * | 2/2006 | Chernoff et al. | 180/333 |
| 7,142,963 | B2 * | 11/2006 | Borroni-Bird et al. | 701/41 |
| 7,203,582 | B2 * | 4/2007 | Yokota | 701/41 |
| 7,295,908 | B2 * | 11/2007 | Goto et al. | 701/43 |
| 7,344,200 | B2 * | 3/2008 | Borroni-Bird et al. | 303/15 |

(Continued)

FOREIGN PATENT DOCUMENTS

DE    44 20 749 C1    10/1995

(Continued)

OTHER PUBLICATIONS

German Search Report dated Jun. 22, 2006.

(Continued)

*Primary Examiner*—Toan C To
(74) *Attorney, Agent, or Firm*—Edwards Angell Palmer & Dodge LLP; Scott D. Wofsy; Joshua L. Jones

(57) ABSTRACT

The invention relates to a steering actuation device for a vehicle, in particular for an industrial truck, having an operating element for inputting steering commands by exerting torques on the operating element, having a sensor arrangement for monitoring the steering command input state of the operating element and having a control device for converting the steering command input data detected by the sensor arrangement into control information for a steering drive apparatus of a wheel, which can be steered, of the vehicle, the sensor arrangement detecting the respective steering command input state of the operating element by means of monitoring the elastic material deformation, in particular torsion, of an element, which is subjected to elastic deformation by means of a steering command input torque on the operating element and is coupled to or associated with the operating element.

14 Claims, 1 Drawing Sheet

U.S. PATENT DOCUMENTS

| | | |
|---|---|---|
| 2002/0108804 A1 | 8/2002 | Park et al. |
| 2004/0256171 A1 | 12/2004 | Sugitani |
| 2005/0247508 A1 | 11/2005 | Gilliland et al. |

FOREIGN PATENT DOCUMENTS

| | | |
|---|---|---|
| DE | 19625500 A1 | 1/1998 |
| DE | 199 52 217 A1 | 5/2001 |
| DE | 10114688 C1 | 3/2002 |
| DE | 10 2004 026 147 A1 | 2/2005 |
| EP | 0900719 | 3/1999 |

OTHER PUBLICATIONS

European Search Report dated Nov. 2, 2009 for European Patent Application No. 06020751.1.

* cited by examiner

STEERING ACTUATION DEVICE FOR A VEHICLE, IN PARTICULAR FOR AN INDUSTRIAL TRUCK

BACKGROUND OF THE INVENTION

1. Field of the Invention

The invention relates to a steering actuation device for a vehicle, in particular for an industrial truck, having an operating element for inputting steering commands by an operator exerting torques on the operating element, having a sensor arrangement for monitoring the steering command input state of the operating element and having an electronic control device for converting the steering command input data detected by the sensor arrangement into control information for a steering drive apparatus of an element determining or influencing the direction of travel of the vehicle.

2. Description of Related Art

Industrial trucks, in particular electrical fork-lift trucks, are known which have a rotatably mounted steering operating element, which is normally a steering wheel. An angle transmitter, whose measurement signal is fed to an electronic control device, is usually used to monitor the rotary position of the steering wheel. The electronic control device generally comprises at least one microprocessor and is designed to control a steering motor depending on the respective rotary deflection of the steering operating element, which steering motor may act on a wheel, which can be steered, of the industrial truck via a steering transmission in order to steer this wheel.

Industrial trucks are also known in which such a steering operating element in the form of a steering wheel is mounted rotatably on an operating console, which has further actuators for controlling further driving functions and/or working functions of the industrial truck.

SUMMARY OF THE INVENTION

The present invention is based on the object of simplifying a steering actuation device of the type mentioned at the outset and making it more operator-friendly.

In order to achieve this object, the invention proposes that, in the case of a steering actuation device with the features mentioned at the outset, the sensor arrangement is designed to detect the respective steering command input state of the operating element by means of monitoring the elastic material deformation, in particular torsion, of an element, which is subjected to elastic deformation by means of a steering command input torque on the operating element and is coupled to or associated with the operating element, and that the control device is designed to control the steering drive apparatus in accordance with a steering characteristic program, which in each case takes into consideration the level and/or duration of the respective steering command input torque detected by the sensor arrangement in order to provide control information for the steering drive apparatus. It may be left to a person skilled in the art to design a steering characteristic suitable for the vehicle, possibly whilst taking into consideration conditions during driving operation, and to use it as a basis for the steering characteristic program.

This inventive concept makes it possible to use, for example, a fixed steering device, which is therefore not mounted such that it can rotate by means of a rotary bearing, as the operating element, which, when subjected to a torque, results in elastic torsion in the holding rod assembly which connects the steering device to a frame part or body part of the vehicle. The sensor arrangement preferably comprises at least one torsion sensor or force/travel sensor for detecting the torsion. This may be, for example, strain gauges and/or piezoelectric elements or the like. In principle, various torsion measuring devices, static torque transmitters, strain measuring systems etc. are suitable for detecting the elastic torsion or elastic material deformation. The control device is preferably designed to control the steering drive apparatus in accordance with a steering characteristic program, which in each case takes into consideration the level and/or duration of the respective steering command input torque detected by the sensor arrangement in order to provide control information for the steering drive apparatus. In particular, various steering characteristic programs may be available for the control device which can be called up automatically as a function of changing vehicle operating conditions, such as the gross weight of the vehicle, or can optionally be called up manually by the operator in order to adjust a respective steering response of the vehicle.

The element which is subjected to elastic deformation, in particular torsion, may consist of metal, for example steel. In one preferred embodiment, the element which is subjected to elastic material deformation is produced primarily from plastic or hard rubber. The resolution of the steering transmitter system comprising the operating element and the sensor arrangement depends in particular also on the material elasticity of the element which is subjected to elastic material deformation. If a material with very pronounced elasticity is selected, when the operating element is subjected to a steering command input torque, a compensation movement of the operating element is macroscopically noticeable. In the case of hard-elastic materials, such as metals, the operator, when exerting a steering command input torque on the operating element, will not macroscopically perceive a movement of the operating element. One advantage of the steering actuation device with a fixed operating element consists in the fact that it provides a secure hold for the operator when controlling the vehicle. This is particularly important in the case of industrial trucks which are controlled by the person in question in a standing position.

The invention should therefore be distinguished from conventional auxiliary force steering systems with the detection of torques of a rotatably mounted steering column for the purpose of metering auxiliary steering forces.

The operating element is preferably designed such that the operator can control further functions of the vehicle, for example raising and lowering functions of load-bearing forks of an industrial truck. For this purpose, special actuator elements can be provided on the steering actuation device. In accordance with one variant of the invention, the control command is input for such further functions in a similar manner to the input of the steering command by exerting torques on the operating element and thereby induced elastic material deformations, in particular torsions of an element which is coupled to or associated with the operating element, it being necessary to exert the control command input torques in different directions, in particular directions which are essentially orthogonal with respect to one another, in order to control the various functions. It is thus possible, for example, for an approximately vertical torsional axis or a torsional axis which is at a slight angle to the vertical to be provided for the steering command input torque, whereas a horizontal torsional axis or bending axis is used for the raising/lowering command input for the raising/lowering function of a load-bearing means of an industrial truck. In the case of all these operations, the operator preferably has to use only low forces, without having to carry out macroscopic control movements of the operating element. This increases the safety for the operator.

The steering actuation device according to the invention can moreover be realized in an inexpensive manner using simple means, is maintenance-free and is barely susceptible to faults.

In accordance with one particular embodiment of the invention, the operating element is mounted such that it has only a very limited amount of steering actuation play associated with the straight-on driving position of the wheel, which can be steered, between two stop positions, the sensor arrangement being designed to detect steering command input torques exerted on the operating element beyond the stop position. The operator can therefore carry out a steering deflection using the operating element in one or the other direction.

The operating element can be mounted such that it can move between two stop positions over a very limited active steering actuation range and can also even trigger steering movements of the wheel, which can be steered, of the vehicle in this steering actuation range. The sensor arrangement can then monitor the movement state of the operating element in the steering actuation range and output relevant control signals for the steering drive of the wheel which can be steered. Beyond the stop position, the steering command input detection takes place in the manner described above by means of detection of the elastic material deformation or torsion of the element, which is subjected to elastic deformation and is coupled to or associated with the operating element.

In accordance with one preferred embodiment of the invention, the operating element is in the form of an operating console having two handles, which are arranged at a distance from one another and by means of which an operator can exert a steering command input torque on the operating console. The operating console preferably has a holding connection piece for the purpose of fixing it to a body part or frame part of the vehicle, the sensor arrangement being designed to detect torsions of the holding connection piece as a measure of steering command input torques. Such an operating console may comprise actuator elements for various vehicle functions and in particular a display for displaying respective vehicle states.

In accordance with one development of the invention, provision is made for a steering command display device to be provided which feeds back the extent of the steering command input torque to the operator. Such feedback is usually also referred to as "forced feedback". It is therefore possible, for example, for provision to be made for the steering command display device to comprise an apparatus for producing a vibration signal, which is dependent on the steering command input torque, at the operating element. The greater the steering command input torque, which is exerted by the operator, at the operating element is and/or the more severe the present steering deflection of the element determining the direction of travel, for example a wheel which can be steered, is, the more intensive is the vibration signal which is preferably produced in the handles of the operating element. The vibration frequency and/or the vibration intensity can therefore be dependent on the exerted steering command input torque and/or on the steering deflection of the element determining the direction of travel.

In addition, the invention relates to an industrial truck having a steering actuation device according to the invention.

The invention can be generalized to include a vehicle having an operating element for inputting control commands for at least one driving and/or working function of the vehicle by an operator exerting torques on the operating element, having a sensor arrangement for monitoring the control command input state of the operating element and having an electronic control device for converting the control command input data detected by the sensor arrangement into control information for a apparatus carrying out the driving or working function, the sensor arrangement being designed to detect the respective control command input state of the operating element by means of monitoring the elastic material deformation, in particular torsion, of an element, which is subjected to elastic deformation by means of a control command input torque on the operating element and is coupled to or associated with the operating element, the control device being designed to control the drive apparatus in accordance with a control characteristic program, which in each case takes into consideration the level and/or duration of the respective control command input torque detected by the sensor arrangement in order to provide control information for the drive apparatus. It may be, for example, a road vehicle, a watercraft or an aircraft.

Since steering with a virtually rigid steering device is to a certain extent a "more spectacular" effect, the device can advantageously also be used in pleasure vehicles, for example bumper cars.

The main application area of the invention is, however, the field of working vehicles and controllable working devices.

BRIEF DESCRIPTION OF THE DRAWINGS

One exemplary embodiment of the invention will be explained in more detail below with reference to the figures, in which.

DETAILED DESCRIPTION OF THE PREFERRED EMBODIMENTS

Figure 2:
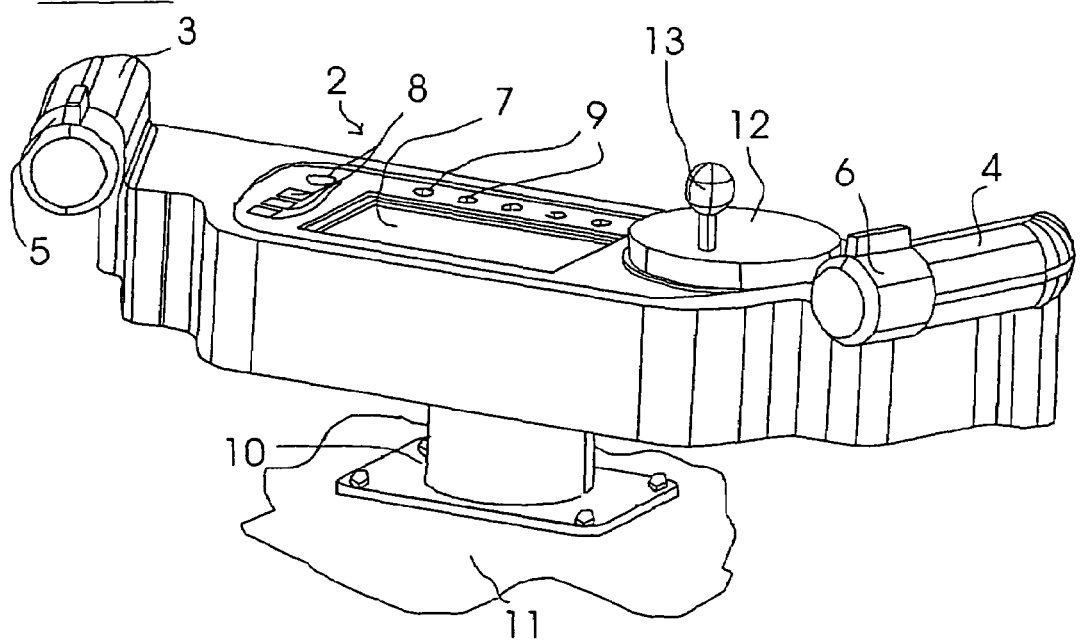
FIG. 2 shows a console having a modern design in accordance with the prior art, in a perspective illustration.

The console 2 showing in FIG. 2 in accordance with the prior art is a control panel of an industrial truck. The operating console 2 has two handles 3, 4 for the driver of the industrial truck. At the front ends, the handles 3, 4 have rotary actuators 5, 6, which can be actuated by the thumb of one hand resting on the relevant handle in order to control certain working functions, for example positional adjustments of a load-bearing fork. The operating console 2 also has a display 7 for displaying diverse vehicle states of the industrial truck. In FIG. 2, 8 identifies control keys for a control computer, with which the display 7 is also associated. The display elements 9 likewise serve the purpose of displaying vehicle states, for example as warning indicators.

The console 2 is screwed to a frame part or body part 11 of the industrial truck at the fixing flange 10. In order to steer the industrial truck, a steering wheel 12 is available for the driver which is mounted rotatably in the console 2, a rotary angle transmitter (not shown) detecting the respective rotary position of the steering wheel 12 and passing on its measurement information to the control computer. The control computer converts these steering command input data into control information for an electrical or possibly hydraulic steering motor, which acts on at least one wheel, which can be steered, of the industrial truck directly or via a steering transmission in order to adjust its steering position on the basis of the steering command given at the steering wheel 12.

During travel, the driver has to operate the steering wheel 12 with one hand using the steering wheel rotary pin 13, with the result that, at least with this hand, he does not have a secure hold on the operating console 2.

Figure 1:
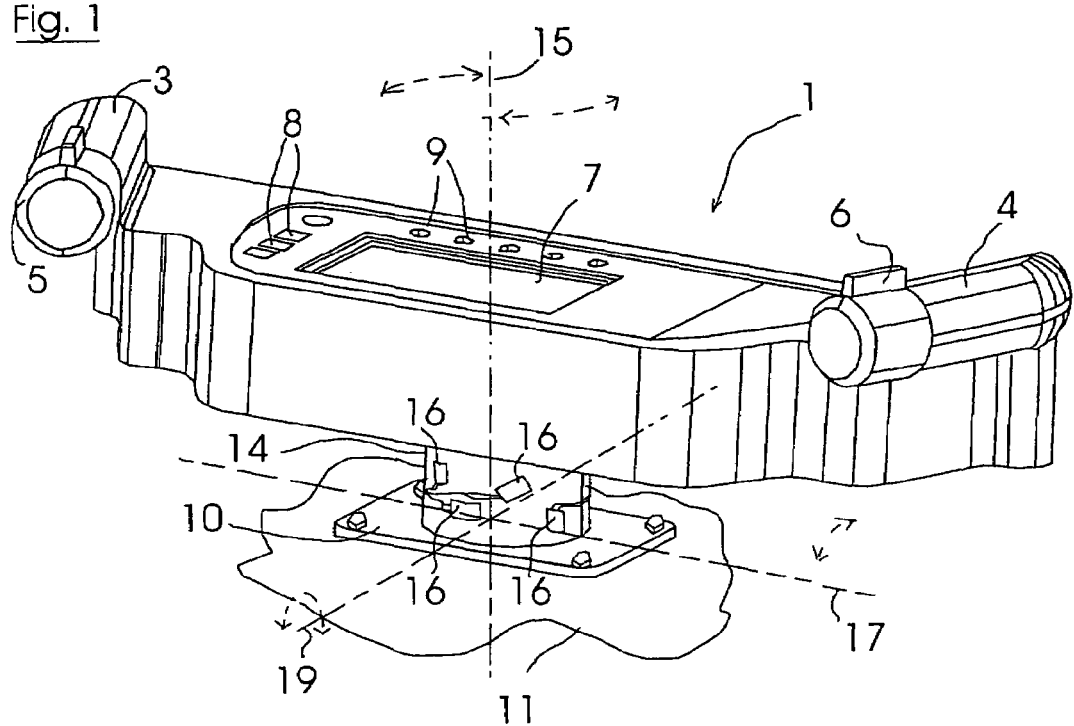
FIG. 1 shows an operating console as an operating element of a steering actuation device according to the invention, in a perspective illustration.

With reference to FIG. 1, one exemplary embodiment of an operating element of a steering actuation device according to the invention will now be explained. The operating element is an operating console, which corresponds in many details to the operating console shown in FIG. 2. To this extent, mutually corresponding reference symbols have been used to identify the same elements in FIGS. 1 and 2, with the result that reference can be made to the above description in relation to FIG. 2 for the explanation of these elements.

The console 1 in FIG. 1 differs from the console 2 in FIG. 2 in particular by the fact that the console 1 does not have a steering wheel (cf. 12, 13 in FIG. 2). As the operating element for inputting steering commands, the driver can overall handle the operating console 1 by exerting a torque on the operating console 1 using his hands gripping the handles 3, 4 in order to produce an elastic material deformation, in particular torsion, in the region of the holding connection piece 14, which, in accordance with one variant, may be a tube element. A main torsional axis in this regard for the steering command inputs is identified in FIG. 1 by 15. Sensors 16 are provided in the region of the holding connection piece 14, which sensors form a torsion sensor arrangement or a torque sensor arrangement, by means of which the steering command input torques exerted on the operating console 1 can be detected. The sensor elements 16 may be, for example, strain gauges, piezoelectric sensors etc. The measurement signals of the sensors 16 are processed by the control computer (not shown) as steering command input data and converted into control information for a steering motor (not shown) of the vehicle in order to adjust a wheel, which can be steered and is controlled thereby, of the vehicle on the basis of the steering command input. The operating console 1 can be arranged rigidly such that the driver does not notice any compliance of the operating console when steering, even though the sensors 16 detect the exerted steering torques. In the case of a "softer" hold of the operating console for example by means of a holding connection piece 14 consisting of hard rubber, plastic or the like, it is possible for a certain degree of rotational compliance of the operating console owing to the elastic torsion to be noticed and to be completely desired. This rotational compliance should, at least in one embodiment of the invention, be kept within a very narrow angular range in order that the driver also always has a secure hold on the handles 3 and 4 with both hands when steering and, moreover, no space-consuming steering movements of the operating console 1 are required.

FIG. 1 also shows the thumb-operated rotary switches 5, 6 for further vehicle functions. In the case of an industrial truck, these may be the positioning functions of the load-bearing fork, in particular raising and lowering functions, which have already been mentioned.

In accordance with one preferred development of the invention, provision is made for torques which are exerted by the driver on the operating console 1 with reference to an essentially horizontal axis 17 which is orthogonal with respect to the torsional axis 15 to be detected by means of appropriate sensors 16 at a suitable point. The control computer converts the data obtained in the process into control information for further vehicle functions. These may be, for example, the raising and lowering function of the load-bearing fork of an industrial truck. If the driver attempts to tilt the operating console 1 about the axis 17 towards the front, the control command "lower load-bearing fork" is derived from this. If the driver attempts to tilt the operating console 1 in the opposite direction about the axis 17 towards the rear, the control computer derives the control command "raise load-bearing fork" from the tilting moment measured in the process. The control computer passes on this control information to the normally hydraulic lifting drive. The thumb-operated rotary switches 5, 6 can be dispensed with in the variant of the invention described above or are available for other functions.

In addition, it is conceivable that driving functions of the vehicle can also be controlled in the manner explained above, for example the forward/reverse travel input with speed control.

Reference will be made to the fact that, in accordance with the invention, there are numerous further possibilities for realizing an operating element for a steering actuation device. For example, instead of the holding connection piece 14 in FIG. 1, a torsion rod or a torsion tube or a torsion spring can be provided as the console bearing element, the spring hardness determining the degree of compliance of the operating console when control command input torques are applied.

The steering actuation device in FIG. 1 may be equipped with a so-called "forced-feedback" function. It is thus possible, for example, for provision to be made for, depending on the level of the torque exerted on the operating console 1 and/or depending on the degree of displacement of the wheel, which can be steered, from the neutral position, for a vibration signal to be noticeable at the handles 3, 4 and/or a display signal to be observed on the display 7 and/or an audible signal to be output which informs the driver of the degree of control intervention.

The control computer is programmed such that it converts the respective steering command inputs corresponding to a specific steering characteristic. By calling up different programs, such steering characteristics can be varied. Corresponding modifications of the control program can also be provided with respect to other operating functions.

In FIG. 1, 19 indicates a further axis with respect to which further torques can be exerted on the operating console 1 in order to control additional functions.

The invention claimed is:

1. Steering actuation device for a vehicle, having an operating element for inputting steering commands by an operator exerting torques on the operating element, having a sensor arrangement for monitoring the steering command input state of the operating element and having an electronic control device for converting the steering command input data detected by the sensor arrangement into control information for a steering drive apparatus of the vehicle, wherein the sensor arrangement is configured to detect the respective steering command input state of the operating element by means of monitoring the elastic material deformation of an element, which is subjected to elastic deformation by means of a steering command input torque having a level and duration on the operating element and is coupled to or associated with the operating element, and wherein the control device is configured to control the steering drive apparatus in accordance with a steering characteristic program, which in each case takes into consideration the level and/or duration of the respective steering command input torque detected by the sensor arrangement in order to provide control information for the steering drive apparatus.

2. Steering actuation device according to claim 1, wherein the operating element is fixed such that it has no margin for steering movement beyond elastic material deformation.

3. Steering actuation device according to claim 1, wherein the operating element is mounted such that it has a limited amount of steering actuation play associated with the straight-on driving position of the steering drive apparatus between two stop positions, the sensor arrangement being configured to detect steering command input torques exerted on the operating element beyond the stop position.

4. Steering actuation device according to claim 1, wherein the operating element is mounted to move between two stop positions over a limited steering actuation range, and the sensor arrangement comprises a sensor which monitors the movement state of the operating element in the steering actuation range, the sensor arrangement also being configured to detect steering command input torques exerted on the operating element beyond the stop position.

5. Steering actuation device according to claim 1, wherein various steering characteristic programs are available for the control device which can be called up selectively.

6. Steering actuation device according to claim 1, wherein the operating element is an operating console having two handles, which are arranged at a distance from one another and by means of which an operator can exert a steering command input torque on the operating console.

7. Steering actuation device according to claim 6, wherein the operating console has a holding connection piece for the purpose of fixing it to a body part or frame part of the vehicle, and wherein the sensor arrangement is designed to detect torsions of the holding connection piece as a measure of steering command input torques.

8. Steering actuation device according to claim 6, wherein the operating console is designed to control further vehicle functions.

9. Steering actuation device according to claim 1, wherein a steering command display device is provided which feeds back the extent of the steering command input torque to the operator.

10. Steering actuation device according to claim 9, wherein the steering command display device comprises an apparatus for producing a vibration signal, which is dependent on the steering command input torque and/or on the present steering deflection of the steering drive apparatus, at the operating element.

11. Industrial truck having a steering actuation device, the steering actuation device having an operating element for inputting steering commands by an operator exerting torques on the operating element, having a sensor arrangement for monitoring the steering command input state of the operating element and having an electronic control device for converting the steering command input data detected by the sensor arrangement into control information for a steering drive apparatus of the vehicle, wherein the sensor arrangement is configured to detect the respective steering command input state of the operating element by means of monitoring the elastic material deformation of an element, which is subjected to elastic deformation by means of a steering command input torque having a level and duration on the operating element and is coupled to or associated with the operating element, and wherein the control device is configured to control the steering drive apparatus in accordance with a steering characteristic program, which in each case takes into consideration the level and/or duration of the respective steering command input torque detected by the sensor arrangement in order to provide control information for the steering drive apparatus.

12. Vehicle having an operating element for inputting control commands for at least one driving and/or working function of the vehicle by an operator exerting control command input torques on the operating element, having a sensor arrangement for monitoring the control command input state of the operating element and having an electronic control device for converting the control command input data detected by the sensor arrangement into control information for a drive apparatus carrying out the driving or working function, wherein the sensor arrangement is configured to detect the respective control command input state of the operating element by means of monitoring the elastic material deformation of an element, which is subjected to elastic deformation by means of a control command input torque having a level and duration on the operating element and is coupled to or associated with the operating element, and wherein the control device is designed to control the drive apparatus in accordance with a control characteristic program, which in each case takes into consideration the level and/or duration of the respective control command input torque detected by sensor arrangement in order to provide control information for the drive apparatus.

13. Vehicle according to claim 12, wherein the vehicle is an industrial truck.

14. Vehicle according to claim 13, wherein the working function of the industrial truck is the raising and lowering function of a load-bearing means.

* * * * *